Nov. 17, 1964 H. T. ADKINS 3,157,810
INDUCTOR ALTERNATOR
Filed June 18, 1962

INVENTOR.
Harold T. Adkins
BY
Dale A. Winnie
ATTORNEY though the flux path switches between different power poles; that is, as one set of rotor and stator teeth pass out of alignment and another set come into alignment.

United States Patent Office 3,157,810
Patented Nov. 17, 1964

3,157,810
INDUCTOR ALTERNATOR
Harold T. Adkins, Marshfield, Mass., assignor to Curtiss-Wright Corporation, Utica, Mich., a corporation of Delaware
Filed June 18, 1962, Ser. No. 203,339
5 Claims. (Cl. 310—168)

This invention relates to electrical power generators in general, and more particularly to inductor-alternator generators having both excitation and power output windings provided on the stator and including a windingless rotor member.

The inductor alternator of this invention is similar in basic principle to that of my co-pending patent application S.N. 41,142 having a filing date of July 21, 1959 and titled High Speed Generator. In brief, the basic similarity is in having both the rotor and stator of laminar construction and with the stator formed to include circumferentially spaced flux passing and by-passing pole faces with excitation and power output windings provided therebetween while the rotor includes uniformly and circumferentially spaced pole faces without windings or permanent magnets provided thereon.

As taught by my aforementioned application for Letters Patent, a current through the field winding establishes a general flux pattern between rotor and stator teeth which are aligned. With a constant field current, the overall flux level remains essentially constant although the flux path switches between different power poles; that is, as one set of rotor and stator teeth pass out of alignment and another set come into alignment.

As will be appreciated, a constant flux level has certain obvious advantages over systems in which the flux level is progressively increased and decreased in the course of rotor rotation.

In the course of rotor rotation with my previous generator there is, however, a change in the flux level at the individual power poles due to the rotor and stator teeth thereof coming into and passing out of alignment. This changing flux induces a voltage in a power winding, which is conveniently disposed within the changing flux path, and one which is proportionate to the number of power winding turns, the rate of flux change or switching, and the level of the flux change.

My previous application teaches that by the interconnecting alternate clockwise and counter-clockwise power windings a high frequency high power output may be obtained. Further, by either modulation of the field current frequency or subsequent modulation, rectification and filtering of the high power high frequency output, a power output of a desired frequency can be readily obtained.

Heretofore, I made use of a stator slot arrangement between groups of stator teeth, to form a stator pole group, and one which was of a greater width than a stator tooth and sufficient to cause flux switching. This, I now appreciate, has certain disadvantages.

A stator slot which is oversized in width reduces the number of stator teeth pole groups which can be provided in a given space. This, in turn minimizes the power output that might otherwise be obtained since flux switching is also slower for a given speed of rotor rotation. Other shortcomings are in having more copper in the windings, which must be larger to span the greater distances, and in having more iron losses due to the longer flux path.

The solution to this problem is not readily apparent since it is at first most logical to assume that there is a limit to the number of pole groups that can be provided within a surface and still accommodate windings having a reasonable number of turns in order to obtain a significant power output. Secondly, since windings of a reasonable size must be accommodated, and flux switching must be accomplished in conjunction therewith, what better way than by a stator slot of oversized width and capable of receiving a larger number of winding turns?

It must also be appreciated that heretofore the area of stator and rotor teeth have ideally been similar so that an oversized slot equal in width to a tooth and a slot was the most logical way of accomplishing flux switching.

It is an object of this invention to provide an inductor alternator generator wherein more flux conductive paths may be obtained in a given space while preserving flux switching characteristics between respective pole groups without a sacrifice in the number of winding turns which may be accommodated.

Another object of this invention is to obtain a flux switching advantage in an inductor alternator while minimizing copper and iron losses incident to the length of windings and flux conductive paths.

These and other objects and advantages, as for example in the use of split loop-skein windings, will be better appreciated and understood after reading the following specification in regard to a preferred embodiment of this invention and with reference to the accompanying drawing.

Figure 1:
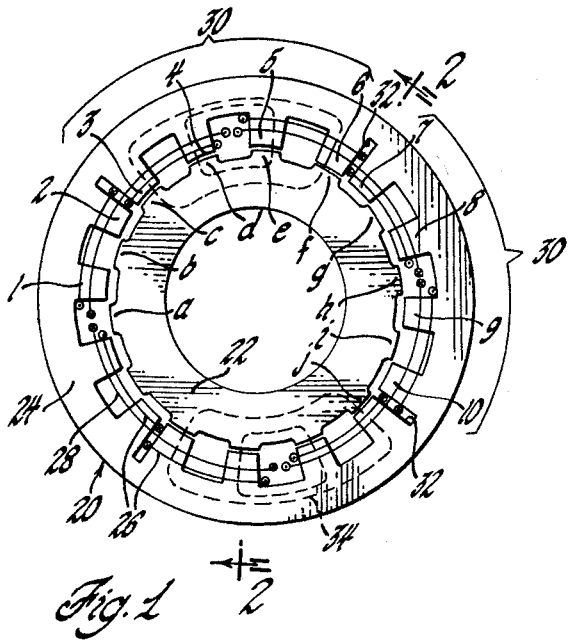
FIGURE 1 is a plan view of the rotor and stator members with field and power windings shown diagrammatically thereon.
Figure 2:
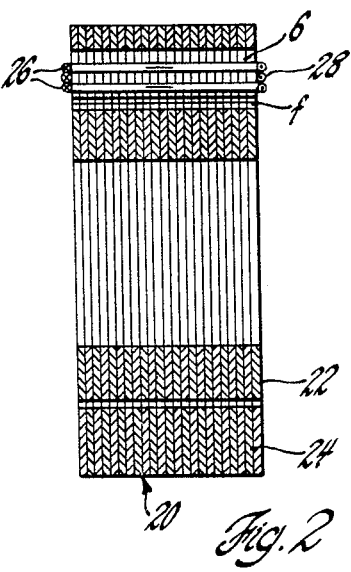
FIGURE 2 is a cross sectional view of the stator and rotor members of FIGURE 1 as seen in the plane of line 2—2 and looking in the direction of the arrows thereon.

Referring to the drawing in further detail:

In one of the preferred embodiments of this invention the inductor alternator generator 20 includes a rotor 22 and a stator 24 which are of laminated construction as best shown by FIGURE 2 and as is conventionally known. The rotor 22 includes no windings and the stator 24 has power and field windings 26 and 28 provided thereon.

In the disclosed generator arrangement the rotor member 22 is concentrically disposed within the stator 24 with a radial air gap provided therebetween. However, the pole face and winding arrangement hereinafter described may also be incorporated within an axial air gap rotor and stator arrangement.

Figure 3:
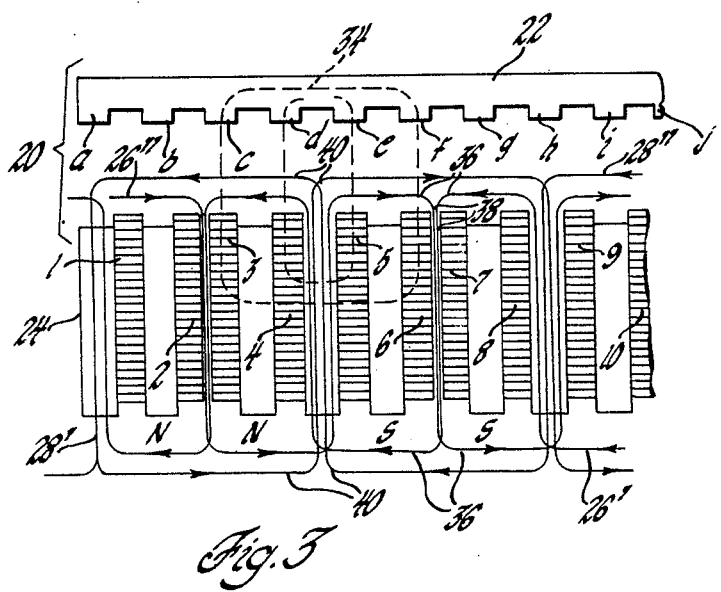
FIGURE 3 is an exploded and diagrammatic view of the rotor and stator members of FIGURE 1 as laid open and flat to show relative rotor and stator tooth positions and with a similar but different arrangement of field and power windings.

The rotor 22 includes uniformly spaced pole faced teeth around the peripheral circumference thereof of which a series thereof are identified by the letters "a" through "i" in the drawing FIGURES 1 and 3. The pole faces are of a width substantially equal to the spacing therebetween. In the present instance a total of fourteen pole faces or teeth are provided on the rotor member.

The stator member 24 is formed to include a plurality of teeth or pole faces about the inner periphery thereof of which, in the present instance, certain thereof are identified by the numerals 1 through 10. Certain of the spaces provided between the stator pole faces serve as winding receptive slots in a manner later described. It will also be appreciated that certain adjacently disposed numbers of the stator pole faces, such as pole faces 3 through 6, and 7 through 10, form pole face groups 30. These pole face groups 30 are provided about the stator and are equally spaced therearound by flux switching slots 32 which are provided therebetween.

Although different groups 30 of stator pole faces are shown as diametrically aligned across the stator, this is of no particular significance as regards the flux conductive path and is not to be confused with other arrangements in which such an alignment is desirable and necessary. As will be later seen, the flux paths in the disclosed generator are between aligned rotor and stator pole faces which are in closer proximity to each other. Such a flux path is shown and identified in the lower part of FIGURE 1 by the reference numeral 34.

In the arrangement of rotor and stator pole faces thus far described it will be noted that certain of the stator pole faces of the individual groups 30 are spaced for flux passing alignment with the rotor pole faces; as for example stator pole faces 3, 4, 5 and 6 with respect to rotor pole faces $c$, $d$, $e$ and $f$. Further, that the next adjacent group 30 of rotor pole faces are misaligned with their next adjacent rotor pole faces; as for example stator poles 7, 8, 9 and 10 with respect to rotor poles $g$, $h$, $i$ and $j$.

The aligned and misaligned arrangement of the stator and rotor pole faces is due to the relative spacing between the stator pole faces of the individual groups with respect to the spacing between the rotor pole faces and, further, is obtained by means of the slots 32 between the different stator pole groups 30.

The stator pole group separating slots 32 will be noted to be of one-half the width of the spacing between the stator pole faces of the individual stator groups 30. Accordingly, a single tooth progression of the rotor 22 causes the alignment of rotor and stator pole faces to shift from one group of stator pole faces to the next adjacent group thereof. As the slots 32 are narrower than the spacing between the rotor and pole faces it will be appreciated that more rotor and stator pole faces may be accommodated within a given space than were the slot half again or more wider than a stator slot, to obtain the same advantage. This, in turn, means that less copper is required for the power and field windings 26 and 28, since they are smaller; furthermore, it will be appreciated that a shorter iron path is also obtained since more pole faces are provided within the same area.

The flux switching slot 32 is seen to be of greater depth as well as narrower than the other stator tooth separating spaces. The greater depth of the slots 32 provides space for an adequate number of turns for any given output voltage in lieu of a wider slot.

The pole tooth spacing disclosed also takes maximum advantage of the expensive copper in the different windings as the ineffective end or connecting turns are much shorter because of the closer spacing of the poles.

It is also apparent that the deeper separating slots 32 are of no consequence as regards a reduction in the iron path since the slots are boundaries of different pole groups and are not traversed by flux lines.

Referring now to the arrangement of the power and field winding 26 and 28:

The power winding 26 may include separate interconnected windings as indicated by FIGURE 1 but preferably is a split winding wherein the end turns 36 thereof are divided on opposite ends of the stator member 24 as shown by FIGURE 3 and identified as 26' and 26". This arrangement has the same number of inductive turns 38 provided within a given stator pole face separating slot as would otherwise be present and it will also be appreciated that the inductive turns 38 extending between a given pair of stator pole faces are conductive in the same direction.

The separate parts of the split power winding 26 are continuous sinusoidal windings which are respectively conductive in opposite directions but are so arranged so as to have like inductive turns 38 provided within the same space between adjacent stator pole faces. The advantage obtained is one of a balance of bulk on opposite ends of the stator member, use of preformed windings, and in having, in effect, complete turns about the stator pole faces balancing out any adverse effects which other winding turns conductive in an opposite direction might introduce.

The field winding 28 is also a split winding, identified 28' and 28" in FIGURE 3, providing oppositely aligned and conductive end turns 40 on opposite ends of the stator member with turns 42 conducting current in the same direction provided between common and adjacently disposed stator pole faces.

It will be noted that the power winding turns are provided about adjacently disposed of the stator pole faces, as for example 5 and 6, in alternately conductive directions, as for example in comparison with pole faces 3 and 4 and pole faces 7 and 8. It will also be appreciated that the power winding turns 38 extend through the flux switching slot 32 and the slot or space centrally of the stator pole face group 30 and thereby divide the stator pole faces into pole face pairs.

The field winding turns 42 and disposed within the same stator slots as the power winding turns 38 in the different stator pole face groups. The field winding accordingly encompasses adjacently disposed pairs of the stator pole faces of adjacently disposed groups thereof. Current flow through the field winding being in one direction around one of the pairs of stator pole faces forming part of a stator pole group and in the opposite direction around the other pair thereof will produce north and south pole pieces within each stator pole group; identified N and S, respectively.

With the rotor member 22 having its pole faces aligned with those of the stator member 24, as shown by the alignment of rotor teeth $c$, $d$, $e$, and $f$ with stator teeth 3, 4, 5 and 6, in FIGURES 1 and 3, the flux path 34 will be as indicated; namely between stator pole faces 3 and 4 and stator pole faces 5 and 6 through the rotor member pole faces $c$, $d$ and $e$, $f$.

Upon an advance of the rotor one tooth width the stator pole faces 7, 8, 9 and 10 become aligned with the rotor pole faces $g$, $h$, $i$ and $j$. In turn, each successive tooth progression of the rotor will alternate the alignment of the stator and rotor teeth, and accordingly the flux pattern, between successive pole face groups.

The flux level remains essentially constant as alignment proportionately increases and decreases between the different pole face groups. At the same time, the flux cutting the power winding varies from a minimum to a maximum level during each full rotor tooth movement. This changing flux level within the different pole groups generates an output voltage in the power winding which is proportionate to the number of turns, the flux change per unit of time and the level of flux change which takes place. Since more pole faces may be provided in the same area with the undersized flux switching slot 32 there will be a greater flux change per unit of time and accordingly a higher voltage generated within the alternator disclosed.

Although a preferred embodiment of this invention is shown and described, it will be appreciated that certain variations and modifications therein, some of which have been discussed, are foreseeable and within the scope and spirit of this invention. Such of these modifications and variations as are not specifically excluded by the hereinafter appended claims are to be considered as inclusive thereunder.

I claim:

1. An inductor alternator generator, comprising a rotor having uniformly spaced pole faces provided thereon, a stator having a plurality of pole faces formed thereon and facing the rotor, said stator pole faces being in separate groups of multiple poles, and said groups being spaced equally around the inner periphery of the stator, power windings disposed around adjacent stator pole portions, and successively around said stator, field windings forming loops around stator pole pieces of adjacent groups, and said stator groups having their boundaries defined by comparatively narrow flux switching slots, said slots receiving only turns of the power windings.

2. The inductor alternator generator of claim 1, wherein said flux switching slot is of less width than the spacing between the stator pole faces of a stator pole group.

3. The inductor alternator generator of claim 1, wherein said flux switching slot has no greater width than one-half the spacing between the stator pole faces of a stator pole group.

4. The inductor alternator generator of claim 2, wherein said flux switching slot has a depth greater than the depth of the slots formed between adjacent poles of a stator group for accommodating turns of different power windings disposed in radial alignment therein.

5. An inductor alternator generator, comprising: a windingless rotor having uniformly spaced pole faces provided thereon, a stator having a plurality of pole faces provided thereon and disposed in separate equally spaced groups, a field winding encompassing and common to poles of adjacent groups, the stator pole faces of each group being spaced for flux passing alignment with said rotor pole faces, a flux switching and group separating stator slot of a width less than the spacing between said rotor pole faces, and inductive power output windings provided on said stator, said power winding having oppositely disposed turns extending successively between pairs of stator pole faces of each group.

References Cited in the file of this patent

UNITED STATES PATENTS 2,827,582     Kress _____ Mar. 18, 1958

FOREIGN PATENTS 676,621     Germany _____ June 13, 1939
689,045     Great Britain _____ Feb. 23, 1951